April 26, 1955   C. D. RICHARDSON ET AL   2,707,204
TREATED MICA PAPER INSULATION
Filed Oct. 31, 1951
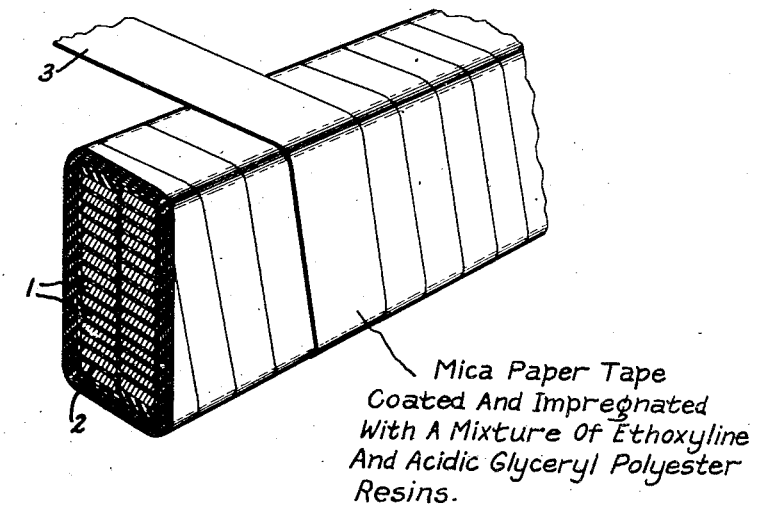
Mica Paper Tape Coated And Impregnated With A Mixture Of Ethoxyline And Acidic Glyceryl Polyester Resins.
Inventors:
Charles D. Richardson,
Algerd F. Zavist
by
Their Attorney.

United States Patent Office 2,707,204
Patented Apr. 26, 1955

2,707,204

TREATED MICA PAPER INSULATION

Charles D. Richardson and Algerd F. Zavist, Schenectady, N. Y., assignors to General Electric Company, a corporation of New York Application October 31, 1951, Serial No. 254,128

13 Claims. (Cl. 174—110)

This invention is concerned with novel micaceous insulations suitable for insulating electrical conductors and electrical machine windings. More particularly, the invention relates to a composition of matter comprising a micaceous material (e. g., backed flakes of mica, or mica paper, or mica tape) impregnated and coated with a mixture of ingredients comprising (1) an acidic polyester containing free carboxyl groups and comprising the product of reaction of a mixture of ingredients comprising glycerine and an aliphatic dicarboxylic acid (or anhydride) containing from 5 to 10 carbon atoms and (2) a complex epoxide resin comprising a polyether derivative of a polyhydric organic compound e. g., a polyhydric alcohol or phenol, containing epoxy groups, which for brevity will hereinafter be referred to as an "ethoxyline resin." The invention also embraces electrical machine windings insulated with such compositions of matter.

In order to secure high space efficiency and high insulation quality in electrical machine windings, for instance, electrical conductors, electrical coils, etc., it has been customary to apply to the assembled turns of a conductor forming the winding, a wrapping of composite insulation composed of a fibrous backing carrying mica flakes united with a resinous binder. A predetermined thickness of the composite mica insulation is wrapped around the assembled turns of the winding in order to provide satisfactory insulation.

In order to insure that the electrical insulation for such windings (which may be such metals as copper, aluminum, silver, etc.) has the optimum properties, such wrapped windings are further impregnated with an insulating varnish. The impregnating process for the wrapped winding or coil (or even coil side) comprises generally first a vacuum treatment to remove moisture, gases, and other deleterious volatile materials from the wrappings around the electrical winding, and then an application of the varnish, which ordinarily may be a polymerizable resin or an asphaltic or bituminous binder in a volatile solvent, often under pressure, in order to insure penetration to the innermost interstices of the winding. Subsequently where a heat-convertible material is used as the coating and impregnating composition, the varnish impregnated winding is heat-treated by baking in order to remove any residual volatile solvent and to polymerize the resin or the varnish.

Unless very careful supervision and control are exercised, electrical machine windings made according to the above description will be found to be incompletely impregnated with the insulating resin resulting in voids or gas spaces as indicated by a steady increase in the power factor with increasing voltage. If the electrical windings are solidly impregnated with resin, the change in power factor with change in voltage will be determined by the characteristics of the resin rather than by the space characteristics of the voids.

Even with the application of so-called "solvent-less" or completely polymerizable varnish materials, tests have shown that the resinous binder uniting the mica flakes and the fiber sheet backing in the composite insulation wrapped on the winding functions to greatly hinder the penetration of any varnish impregnant. Tests in the past have shown that using composite tapes with and without resinous binders, the major proportion of the difficulty encountered in varnish impregnation of insulation on electrical windings or coils may be traced to the presence of the resinous binder in the complete insulation present on the outside of the winding.

Of great importance in the manufacture of insulated electrical windings, in which many of the above difficulties are encountered, is the procedure generally employed in the production of insulated electrical windings which are inserted in slots in dynamoelectric machines. The procedure for insulating these windings is at the present time quite complex. For instance, windings used in large dynamoelectric machines are wound with assembled insulation composed of mica flakes combined with a sheet backing, for example, cellulosic paper, glass fiber cloth, asbestos paper or cloth, and the like, using a resinous binder such as an asphaltic varnish. The procedure is to wrap the winding in a lapping fashion so that there are several wrappings or layers of the mica flake tape on the bar. The adhesion of the tape to itself and to the bar is effected by means of an asphaltic solution which is painted on the electrical winding prior to the first wrapping and thereafter onto each layer after each wrapping. A protective sacrifice tape of, for example, cotton cloth, is wrapped around the insulated winding and the assembly put into a tank to which is applied a vacuum to remove most of the solvent from the assembly. Molten asphalt is then run into the tank under pressure at an elevated temperature in an amount sufficient to cover the wrapped bar and to effect a pressure of about 100 p. s. i. Thereafter, the bar is removed from the tank and the hardened asphalt and sacrifice tape stripped away. This cycle of taping, placing in a tank, evacuating, heating with pressure, using the bitumen or asphalt, removing, and stripping may be repeated a number of times to obtain the desired results. Generally, the number of such cycles is dependent upon the voltages to which the winding will be subjected. The higher the voltage, the greater is the number required of the previously described cycles.

After the final cycle, the winding is considered sufficiently insulated to be used as an electrical winding in electric machines as, for example, motors, generators, etc. Each winding and treating cycle described above takes about 20 hours to complete and obviously constitutes a time consuming and costly procedure in the manufacture of insulated electrical windings, particularly those for dynamoelectric machines such as armature windings for turbine generators.

It is, therefore, one of the objects of this invention to prepare a micaceous type insulation which is suitable for insulating various types of dynamoelectric machine windings or conductors.

Another object of the invention is to insulate electrical machine windings, e. g., armature windings, which are to be used in the manufacture of turbine generators, with an improved insulation which can be applied more efficiently and in less time.

A still further object of the invention is to insulate armature windings so as to obviate the many difficulties which are presently inherent in the existing procedures for producing such insulated windings.

An additional object of the invention is to provide an improved construction for electrical apparatus, particularly with respect to the slot insulation of electric machines.

Other objects of the invention will become more apparent from the description thereof which follows.

We have now discovered that all the objects disclosed above can be realized, the difficulties inherent in producing insulated electrical windings by the procedure described above can be obviated, and many other advantages can be derived by using micaceous material impregnated with a specific combination of resins as insulation for various electrical machine windings and in particular for slot portion insulation of armature half coil windings. In accordance with our invention, we employ a micaceous material (so designated hereinafter to include paper or cloth-backed mica flakes in the form of sheets or tapes, as well as mica paper in sheet or tape form with or without further reinforcement) which is impregnated and coated with a mixture of ingredients comprising (1) an acidic polyester containing free carboxyl groups and comprising the product of reaction of a mixture of ingredients comprising glycerine and an aliphatic dicarboxylic acid or anhydride containing from 5 to 10 carbon atoms and (2) a complex epoxide resin comprising a polyether derivative of a polyhydric organic compound containing epoxy groups.

The use of this coated and impregnated micaceous material when used in connection with the insulation of electrical windings results in many advantages and improvements over the old procedure. For one thing this particular combination of resins has the necessary property of being flexible at 80° C. or lower without losing its toughness at higher temperatures. This permits a coil insulated with the micaceous material impregnated with the resin to be bent to fit into the required slot in the armature. Since ethoxyline resins are inherently brittle at lower temperatures and weak at higher temperatures, the choice of the proper polyester is very important. Moreover our treated and impregnated micaceous material, can be employed in a relatively dry form whereas the procedure for applying and bonding the mica flake tape to armature bars by the old method required, for example,

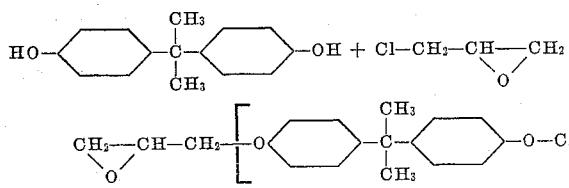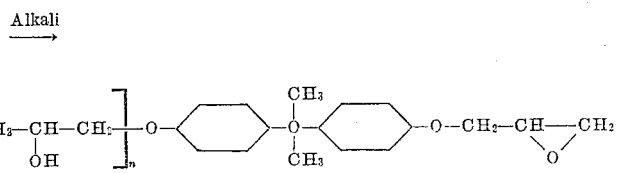

solutions of bitumen or asphalt which become difficult to handle. In addition, the mica flake tape used heretofore must be stored in airtight containers in order to prevent undue evaporation of the solvent which is necessary for retaining flexibility of tape to permit it to be wound satisfactorily around the wiring. In contrast to this, the mixture of resins preferably employed in the practice of our invention when used in combination with the micaceous material has little or no residual solvent and is flexible per se without any added ingredients being necessary for that purpose. Another advantage in employing the micaceous material herein described is the fact that when used as insulation for armature bars, only a one-stage application is required. Consequently, the entire process cycle requires around 12 to 16 hours. In contrast to this, prior methods using the mica flake tape comprise normally a multi-stage operation which usually requires several times as long.

The insulation using mica flake tape employed heretofore and described above is thermoplastic, softening at elevated temperatures, limiting its usefulness at appreciably elevated temperatures. In contrast to this, the impregnated and coated micaceous material employed by us can be cured to the thermostat stage and will be substantially free of flow at elevated temperatures and will operate satisfactorily for long periods of time at temperatures of at least 125° C. In addition, the thermoset product is quite tough physically up to 125° C. Finally, the electrical properties of the micaceous material coated and impregnated with the mixture of resins described above are better than most previous insulating materials. For instance, windings insulated with such treated micaceous material have been found to have dielectric strengths. The fact that the resin used in the insulation has a high dielectric constant at operating temperatures of about 90° C., means that the dielectric stress on the insulation will not be borne to a large extent by the resin. This is an important advantage since most organic resinous insulations have dielectric constants lower than mica and thus carry a disproportionately large share of the voltage stress when used with mica. In addition, insulated windings prepared in accordance with our invention have lower power factors at all operating temperatures than the power factors of electrical windings insulated with the mica flake-asphaltic tape employed heretofore. Further advantages of our micaceous insulation will be more apparent from the examples described below.

The ethoxyline resins employed in the practice of the invention in addition to being defined as being a complex epoxide resin comprising a polyether derivative of a polyhydric organic compound containing epoxy groups are disclosed in various places in the art. Among such references may be mentioned Castan Patents 2,324,483 and 2,444,333, British Patents 518,057 and 579,698. For the most part these ethoxyline resins are based on the resinous product of reaction between an epihalogenohydrin, for instance, epichlorohydrin, and a phenol having at least two phenolic hydroxy groups, for example, bis-(4-hydroxyphenyl) dimethylmethane. U. S. Patents 2,494,295, 2,500,600 and 2,511,913 describe other examples of ethoxyline resinous compositions which may be employed in the practice of the present invention. By reference, the aforementioned patents are intended to be part of the present description of the ethoxyline resins used, and for brevity, the ethoxyline resins will not be described other than that they contain more than one ethylene oxide group, e. g., from 1 to 2 or more epoxide groups, per molecule, and may be prepared by effecting reaction between a polyhydric phenol or alcohol, for example, hydroquinone, resorcinol, glycerin, and condensation products of phenols with ketones, for instance, bis-(4-hydroxyphenyl)-2,2-propane, with epichlorohydrin. For example, the reaction of epichlorohydrin with bis-(4-hydroxyphenyl)-2,2-propane may be formulated as follows:

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

TABLE I

| Epon No. | Epoxide Equivalent | Approximate Esterification Equivalent | M. P., ° C. |
|---|---|---|---|
| RN-34 | 225-290 | 105 | 20-28 |
| RN-48 | 192 | 80 | 9 |
| 1064 | 300-375 | 195 | 40-45 |
| 1062 | 140-165 |  | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

The complex epoxides used with the above-described acidic polyesters contain epoxide groups or epoxide and hydroxyl groups as their functional groups and are generally free from other functional groups such as basic and acidic groups.

Various methods may be used to prepare the highly acidic low molecular weight non-polymerizable polyesters employed with the ethoxyline resins. In order to obtain the highly acidic polyesters it is essential that the dicarboxylic acid or anhydride be employed in an equivalent excess over the glycerine. Thus, it has been found advantageous that for each mole of glycerine employed, from about 2.2 to 3 moles, preferably from 2.5 to 3.0 moles of the dicarboxylic acid, for example, the adipic acid, may be used.

In preparing the polyesters, it is desirable for many applications that the acid number of the polyesters exceed about 250 and preferably be in excess of 300. These polyesters may be prepared generally by heating a mixture of the glycerine and the specific dicarboxylic acid or anhydride (which may be used where the anhydride is obtainable in place of the acid) in the proper molar concentrations at elevated temperatures of the order from about 150° to 250° C. for a period of time ranging from about 1 to 3 or more hours. Reaction is preferably conducted until the acid number is within the desired range, and most of the hydroxyl groups have been esterified so as to give the highly acidic low molecular weight polyesters required for use with the ethoxyline resins. The examples below indicate the manner in which these highly acidic polyesters may be prepared and it is believed that persons skilled in the art will have little difficulty in determining the best method for preparing these acidic polyesters.

In preparing the acidic polyesters described above, in addition to the adipic acid mentioned previously, other aliphatic dicarboxylic acids or anhydrides (the term "acids" is intended to include anhydrides where the latter are obtainable) having from 5 to 10 carbon atoms may be employed. Among these may be mentioned, for instance, glutaric, pimelic, suberic, sebacic, etc., acids. The use of dicarboxylic acids alone or polyesters made from other kinds of dibasic acids, such as aromatic acids, when mixed with the ethoxyline resins and used as treating agents for the micaceous material are unsatisfactory and in many cases cannot be employed in the applications for which the coated and impregnated micaceous material herein described and claimed can be used. This is due to the fact that the former materials do not possess adequate flexibility for the contemplated application. The use of dihydric alcohols in place of glycerine is also undesirable because of the unsatisfactory electrical properties at elevated temperatures.

It should be noted that whereas the usual alkyd resins contain unreacted hydroxyl groups in a concentration approximately equal to the concentration of unreacted carboxyl groups, the acidic polyesters employed in the practice of this invention are formulated with an equivalent excess of carboxyl groups. Since these polyesters are reacted essentially to completion, few, if any, hydroxyl groups remain unreacted. The excess carboxyl groups remain unreacted but attached to the polyester molecules. As a further result of the use of an equivalent excess of carboxyl groups in formulating these acidic polyesters, the latter have in general considerably higher acidity (i. e., higher acid numbers or lower acid equivalent weights) than the usual alkyd resins. Additional examples of the class of acidic polyesters which are advantageously employed in the practice of this invention, as well as further methods for preparation thereof, may be found in the copending application of William E. Cass, Serial No. 254,207, filed concurrently herewith and assigned to the same assignee as the present invention, now U. S. Patent 2,683,131 issued July 6, 1954. The aforesaid Cass application also discloses additional descriptions of ethoxyline resins which are applicable in the present invention.

The mica paper mentioned previously for use with the above-described mixture of resins is more particularly disclosed and claimed in Bardet Patent 2,549,880 issued April 24, 1951. By reference, this patent is made part of the description in the present application, particularly as regards the disclosures for making such mica paper. Generally, it may be stated that mica or another analogous starting material is heated to a temperature sufficient for producing cleavage thereof but lower than the critical temperature corresponding to the total dehydration of said material. After the material has been split into flakes at elevated temperatures, for instance of about 800° C., the split flakes are then thrown as quickly as possible before substantially cooling has occurred, into a saturated solution such as a saturated solution of sodium carbonate or sodium bicarbonate. After cooling the mica is removed from the solution, drained and dropped into a 5% solution of hydrochloric acid. The latter is permitted to act on the mica flakes about one hour and the suspension of mica in this solution is vigorously stirred and the flakes are then washed by decantation. Thereafter the mica flakes are suspended in water similar to suspensions of paper pulp, and this mica flake suspension is then treated by methods analogous to those employed where the treatment of cellulose fibers, with or without the addition of supplementary bodies, for the manufacture of large size sheets, analogous to paper or cardboard sheets.

The mica paper is then coated and impregnated with the mixture of the acidic polyester and the ethoxyline resin, preferably in solution form. The treated paper may then be passed through an oven to remove solvent and thereafter rolled up on itself. The treated mica paper can also be cut to various sizes, for example, into tapes of the order of about ½" to 1¼" wide which can be used in winding operations for insulating purposes. With specific reference to armature or stator bars, the larger tape, that is about 1¼" wide tape, is used to insulate the main body of the bar whereas the narrower tape is used to wrap around end turns.

Although the mica paper impregnated with the mixture of resins has adequate strength for many wrapping and insulating purposes, it may be advantageous in some applications to further reinforce such impregnated and coated mica paper with a cellulosic paper containing glass fibers adhered to and disposed in a longitudinal direction on the surface of the paper. This cellulosic paper which is preferably run concurrently with the mica paper through the mixture of the acidic polyester and the ethoxyline resin is then brought up out of the treating tank together with the coated and impregnated mica paper and passed through an oven to remove most of the solvent and also to bring the cellulosic paper into intimate contact with the mica paper. Thereafter, if desired, squeeze rolls may be employed to further consolidate and compact the cellulosic paper and the mica paper into a unitary laminated sheet which can be used per se for insulation purposes or can be cut into tapes of varying sizes as described above.

While the composite insulation described above is particularly described with reference to mica paper, the term "micaceous material" is intended to include analogous micaceous insulations, particularly mica flakes disposed on a fibrous sheet backing such, for example, as paper, cambric, glass fiber cloth, asbestos cloth, and the like. In such instances, a sheet of paper or cloth coated and impregnated with an insulating varnish, for instance, the mixture of ethoxyline resin and acidic polyester described above, is covered with mica flakes in an overlapping fashion either by hand or by deposition from a mica-laying machine. After deposition of the mica flakes, it is usually desirable to apply to the outer surface of the overlapping mica flakes an additional amount of the above-described insulating varnish, the mixture of the acidic polyester and the ethoxyline resin and thereafter, if desired, a top sheet may be adhered to the layer of mica flakes. This assembly may be rolled up or may be cut into a predetermined width tape for rolling and the rolls placed aside for future use. Such a mica flake tape when used for making insulated stator bars need only be wrapped around electrical machine windings without further application of any binder of impregnant or without multiple processing, and can then be heat-treated under pressure in a manner analogous to that described previously to give a compact insulation having improved electrical properties.

Although the proportions of acidic polyester and ethoxyline resin may be varied within limits depending on the application for which the mixture is intended, the type of polyester used, the type of ethoxyline resin employed, etc., generally, we prefer to use the acidic polyester in an amount ranging from about 5 to 70 percent of the total weight of the ethoxyline resin and the acidic polyester. Good results are obtained when one employs the polyester and ethoxyline resins in such proportions that there is present in the mixture from approximately 0.8 to 1.2 polyester acid equivalents for each epoxide equivalent. Best results especially for impregnating the above-described mica paper are obtained when slightly less an stoichiometric amounts of the acidic polyester, for example, the acidic glyceryl adipate are used.

The manner in which the acidic polyester and the ethoxyline resin may be employed can also be varied. Generally, it is advantageous to dissolve each of the resins in a common solvent, for example, acetone, mixtures of isopropanol and toluene, etc., to make solutions of various resin solids content, which may advantageously range from about 10 to 50 percent solids.

Instead of using mixtures of the acidic polyester and the ethoxyline resin in the unreacted form, it is also possible to employ partially intercondensed products, preferably in a low state of intercondensation, of the two materials which can thereafter be formed into solutions which can be used to treat the micaceous material. Subsequent heat treatment of the insulated object using such treated micaceous material will cause the final curing of the partially condensed reaction product to the essentially thermoset, infusible, and insoluble state. In preparing these partially condensed products, it is generally desirable to heat the polyester resin and while in a fluid condition to add the ethoxyline resin (also heated if necessary to a fluid state) and thereafter heat the mixture of ingredients with stirring until a homogeneous composition is obtained. This initial heating may be at temperatures ranging from about 80° to 150° C. or higher and as high as 200° C. Further directions for preparing these partially condensed compositions may be found particularly disclosed in the aforementioned Cass application Serial No. 254,207, now U. S. Patent 2,683,-

131, issued July 6, 1954, which by reference is made part of the disclosures of the present application.

In order that those skilled in the art may better understand how the present invention may be practiced, the following examples are given by way of illustration and not by way of limitation. All parts are by weight.

EXAMPLE I

An acidic glyceryl adipate polyester was prepared by heating with stirring 438 parts (3 moles) adipic acid and 92.1 parts (one mole) glycerine at 190–210° C. for about two hours. The acidic polyester thus obtained, which had an acid number of 390, was mixed with an ethoxyline resin, specifically Epon 1004, and dissolved in acetone to form a 20 percent resin solids solution in which the acidic glyceryl adipate resin comprised 20 percent by weight of the latter and the ethoxyline resin. Mica paper prepared in accordance with the previous mentioned Bardet Patent 2,549,880 was then coated with the solution three times and allowed to air-dry about two hours between each coating. The resultant treated mica paper (which had a resin solids content of about 32 percent and 3 percent volatile matter) was then cut into a tape which was used to insulate an electrical winding portion, specifically a stator bar, by wrapping the bar in a half-lapped fashion. Thereafter, the wrapped stator bar containing about 17 half-lapped layers was protected by wrapping with a glass cloth sacrifice tape, placed in a pressure tank, and evacuated at a temperature of 60° C. for six hours and thereafter molten bitumen was injected under pressure into the tank so that the temperature and pressure in the tank were about 150° C. and 100 pounds p. s. i., respectively. This treatment was continued for about six hours to induce chemical interconnedsation of the ethoxyline resin with the acidic glyceryl adipate resin and to convert the resinous insulation to the substantially infusible and insoluble state. This treatment also molded and compressed the insulation around the stator bar into a compact mass. At the end of this time, the bar was removed from the asphalt bath, cooled and the adhering asphalt and sacrifice tape removed to give an insulated stator bar having excellent dielectric strength. The insulation on the outside of the bar was tough and compact. The electrical properties of the insulation were substantially better than the electrical properties of the insulation heretofore employed for wrapping stator bars using backed mica flakes bonded with a bituminous or asphaltic binder. Electrical machines using windings so insulated have the added advantage of being operable at higher temperatures than previous electrical machines using asphaltic type insulation.

The accompanying drawing with its single figure in a perspective cross-sectional view shows one of the embodiments of the presently claimed invention in which impregnated and coated mica paper tape is used as insulation for an electrical machine winding, specifically an armature winding used in a dynamoelectric machine. More particularly, the single figure show an armature winding composed of a plurality of conductor turns 1 insulated from each other by a turn insulation 2. If each conductor turn 2 is a single wire, or strap of copper, the insulation thereon may be composed of a resinous insulation coating such as shellac or asphaltic varnish either alone or in combination with a wrapping of glass fabric, asbestos or the like or other insulation. Untreated glass fibers or other inorganic insulation is often sufficient. Wrapped around the armature winding bar are a plurality of lapped layers of mica paper tape 3 coated and impregnated with the mixture of the acidic polyester and the ethoxyline resin. The total assembly is covered with a sacrifice tape which is essentially non-adherent to the insulated tape and which acts as a protective coating for the insulated winding when the entire assembly is immerced in the tank to which is added under pressure, a pressurizing and heating fluid, e. g., molten bitumen or other material. Where practical, mechanical molding of the insulated winding may also be used. After treatment in the pressure tank, the winding is removed therefrom, and the sacrifice tape with any adhering asphalt is stripped from the outer insulation of the winding.

EXAMPLE 2

In this example a solution of resins was prepared as follows: Using a 50–50, by weight, mixture of isopropanol and toluene, a mixture of ethoxyline resins Epon 1064 and Epon 1001 in equal parts, by weight, was mixed with the glyceryl adipate polyester described above in Example 1 so that the resin solids content of of solution comprised about 25 percent, and of the mixture of resins, the glyceryl adipate polyester comprised 18 percent, by weight, and the ethoxyline resin mixture comprised 82 percent, by weight. This solution was placed in a dipping tank and mica paper prepared as described previously was passed simultaneously with thin (.001 inch thick) cellulosic paper containing glass threads disposed on the cellulosic paper in a longitudinal direction, through the resinous solution and thereafter led into an oven to remove the volatile solvents. After emerging from the oven, the two papers, which were already well-adhered to each other and which were substantially tack-free, were passed through squeeze rolls to remove any blisters which might have formed and also to bring the cellulosic paper into still further intimate contact with the mica paper. The paper thus obtained was used in the following manner to wrap a stator bar having a cross-sectional area of about 2" x ¾" and about 9 feet long, and comprising a plurality of about 40 insulated laminations of copper strands. The composite paper of cellulosic and mica paper layers which was about 7 mils thick was cut into tapes of about 1¼" in width. The resin content of the paper was approximately 30 to 32 percent. For the purposes herein stated, it is desirable that the volatile content of the paper of tape should be below 1 percent for optimum results when applied as insulation for various windings. This tape was then used to wrap around a stator bar by half-lapping the tape so that there were 17 half-lapped layers or a total of 34 lapped thicknesses. The stator bar employed comprised a series of laminations of copper wire in which each individual strand was separated from the other strands by an absestos-organic binder insulation. The taped stator winding or bar was then wrapped with a glass cloth sacrifice tape, placed in a tank similar to that described in Example 1, and the latter tank evacuated at 60° C. for about six hours. Thereafter, molten bitumen was passed into the tank under pressure so that the pressure in the tank was approximately 100 p. s. i. The temperature within the tank was maintained at about 150° for approximately 6 to 8 hours. The molded stator bar was removed, the clinging bitumen and sacrifice tape were stripped from the surface of the stator bar to give an insulated compact, molded stator bar in which the resinous portion of the insulation was thermoset and substantially influsible and insoluble. The thickness of the insulation on the stator bar was approximately 180 mils. This stator bar was tested for dielectric strength and percent power factor at various temperatures with the results shown in the following Table II. For comparison, results on an insulated bar (insulation 180 mils thick) using the previously described bitumen binder are also included. The dielectric strength was measured at minute step-ups of voltage stress.

TABLE II

*Backed mica flake-bitumen binder*

| Temperature, ° C. | Percent Power Factor (Crest kv.) | | | |
| --- | --- | --- | --- | --- |
|  | 5 kv. | 10 kv. | 15 kv. | 20 kv. |
| 25 | 2.85 | 2.92 | 2.97 | 3.03 |
| 75 | 7.32 | 7.34 | 7.35 | 7.39 |
| 100 | 15.5 | 15.6 | 16.0 | 16.4 |

Dielectric strength—450 volts per mil (R. M. S.).

*Mica paper-glyceryl adipate-ethoxyline resin*

| Temperature, ° C. | Percent Power Factor (Crest kv.) | | | |
| --- | --- | --- | --- | --- |
|  | 5 kv. | 10 kv. | 15 kv. | 20 kv. |
| 25 | 0.95 | 0.97 | 1.01 | 1.05 |
| 75 | 3.08 | 3.10 | 3.13 | 3.16 |
| 100 | 7.3 | 7.4 | 7.4 | 7.6 |
| 125 | 15.8 | 16.2 | 16.5 | 16.8 |

Dielectric strength—705 volts per mil (R. M. S.).

EXAMPLE 3

This example illustrates the effect on electrical properties of varying the proportions of the ethoxyline resin and the acidic polyester. More particularly, the glyceryl adipate polyester described in Example 1 was mixed with the particular ethoxyline resin indicated in Table III below in the proportions therein designated and the mixtures heated in the form of disks one-tenth inch high and six inches in diameter for five hours at 150° C. Testing the samples gave the following results:

TABLE III

| Composition | Percent Power Factor | | | Dielectric Strength,[1] Minute Steps, volts/mil |
|---|---|---|---|---|
| | 25° C. | 75° C. | 125° C. | |
| 80% Epon 1004<br>20% Polyester | 1.5 | 7.5 | 18.2 | 465 |
| 90% Epon 1004<br>10% Polyester | 1.1 | 4.2 | 5.1 | 425 |
| 87% Epon 1004<br>13% Polyester | 1.3 | 4.4 | 7.8 | 465 |
| 95% Epon 1004 [2]<br>5% Polyester | 1.1 | 4.05 | 27.0 | |
| 93% Epon 1007<br>7% Polyester | 0.95 | 2.2 | 5.4 | 450 |
| 71% Epon 1064<br>29% Polyester | 2.2 | 9.3 | 30.0 | 395 |
| 66% RN-34<br>34% Polyester | 2.5 | 12.0 | 50.0 | 385 |

[1] Root mean square.
[2] Cured at 150° C. for 15 hrs.

From the above described Table III it is apparent that the more fluid, lower molecular weight ethoxyline resins give somewhat higher power factors. It is also apparent that the use of greater than stoichiometric amounts of the glyceryl adipate polyester gives higher power factors than when stoichiometric amounts or less than stoichiometric amounts are employed.

EXAMPLE 4

Laminated panels comprising sheets of the above described mica paper impregnated with mixtures of different ethoxyline resins and the glyceryl adipate polyester described in Example 1 were prepared as follows. Sheets of the mica paper were impregnated with an acetone solution of the mixture of glyceryl adipate polyester and different ethoxyline resins more particularly described in Table IV. The sheets were dried in an oven, superposed upon each other and then heated for five hours at 150° C. under a pressure of 100 p. s. i. The laminates prepared in this manner were tough and showed excellent adhesion between the laminate of paper. When such laminates were struck with a hard object, they off a metallic ring. The electrical properties of such panels as well as the percent weight compositions of the mixture of resins employed in making such panels are given below in Table IV.

TABLE IV

| Resin Composition | Thickness of laminate in mils | Percent power factor at 60 cycles | | | Dielectric strength, minute steps, volts/mil |
|---|---|---|---|---|---|
| | | 25° C. | 75° C. | 125° C. | |
| 87% Epon 1004<br>13% Polyester | 28 | 2.1 | 4.2 | 9.1 | 1,620 |
| 71% Epon 1064<br>29% Polyester | 25 | 2.5 | 13.2 | 20.0 | 1,660 |
| 66% RN-34<br>34% Polyester | 26 | 3.4 | 14.5 | 21.4 | 1,500 |

A 30-mil thick cured laminate using a mixture of (13 percent) glyceryl adipate and (87 percent) Epon resin 1004 when prepared in the manner described above has been maintained at a voltage stress of 425 volts/mil under intense corona for over 500 hours without breakdown and has shown little indication of deterioration.

The heat-converted (i. e. substantially infusible and insoluble) mixture of 87% Epon resin 1004 and 13% glyceryl adipate polyester has shown remarkably low weight losses at elevated temperatures. Thus, at 90° C. the weight loss of such a heat-treated product after 600 hours was 1.02% and 1.63% at 125° C. after the same length of time. At 150° C. the weight loss after 1946 hours was only 3.68%. Most of the weight losses occurred during the first 100 hours due to volatile residues. In addition, there was no apparent impairment of the physical properties of the samples during these heat aging tests.

The above-described tapes or sheets of mica paper impregnated with the mixture of the acidic polyester and the ethoxyline resins can be used as described above as insulation for electrical conductors and various electrical machine windings including armature windings of the relatively high voltage type such as an armature winding embedded in the slots of a stator core of a turbine generator. Because of the fact that such windings can be made at much less expense and faster than is possible by previous procedures, extensive economies can be realized in the manufacture of the electrical machines themselves. This saving is especially evident in the manufacture of generators where one of the bottlenecks in connection therewith is in the production of the insulated stator bars which previously have been made by a relatively slower operation as is more particularly described earlier in the present application.

It will of course be apparent to those skilled in the art that instead of using the acidic polyester or ethoxyline resins employed in the foregoing example, other types of acidic polyesters, for example, glyceryl pimelate, glyceryl sebacate, etc., and other ethoxyline resins may be employed within the scope of the invention. In addition, other procedures for making the treated micaceous material, may also be used as will be evident to persons skilled in the art. Finally, the proportions of the acidic polyester and the ethoxyline resin may be varied within limits, as pointed out previously, and different solutions thereof or low molecular weight condensation products therefrom may also be used without departing from the scope of the presently disclosed and claimed invention.

By means of our invention, it is now possible to insulate various dynamoelectric machine windings, for example, armature windings with a composite superior insulation which has excellent electrical properties and which can be used in an essentially one-step process without repetition of any wrapping and treating cycles. The insulation described above obviates many of the difficulties heretofore encountered and is consistently essentially void-free. This is apparent from the fact that in Example 2 above, at any one temperature, with increasing voltage, the power factor remains substantially constant. Moreover, the insulation described and employed in the practice of our invention requires no further impregnation with other insulating materials after wrapping around the electrical winding. Again, the dielectric strength and the power factor at various temperatures are considerably improved over the same electrical properties inherent in present insulation devoted to covering electrical machine windings. The optimum and desirable results described above are due essentially to the fact that a particular type of resinous insulation comprising two specific resinous materials has been employed. The combination of resinous ingredients when employed in connection with the use of the mica paper described above or when employed to make mica flake tape, has the added property of being flexible and softenable at elevated temperatures so that cracking and short-circuiting of the insulation is minimized as the electrical conductors expand or contract with change in temperature.

The term "winding" employed herein and in the appended claims is intended to include various electrical windings and coils or portions thereof, whether for relays, transformers, or other non-rotating apparatus, or as stator or rotor coils or bars for dynamoelectric machines. Wherever composite insulation of treated micaceous material is employed, the present invention presents many desirable and unusual advantages.

What claim as new and desire to secure by Letters Patent of the United States is:

1. An article of manufacture comprising sheet material, at least a surface of which consists essentially of mica, the said sheet material being coated and impregnated with a mixture of ingredients comprising (1) an acidic polyester containing a plurality of free carboxyl groups sufficient in number to give an acid number above 250 and comprising the product of reaction of a mixture of ingredients comprising glycerine and an aliphatic dicarboxylic acid containing from 5 to 10 carbon atoms in which there are present from 2.2 to 3 mols of the dicarboxylic acid per mol of glycerine and (2) a complex epoxide resin containing epoxy groups and comprising a polyether derivative of a polyhydric organic compound selected from the class consisting of polyhydric alcohols and phenols having at least two phenolic hydroxy groups, the proportions of said polyester and epoxide resin being such that for each epoxide equivalent there are from 0.8 to 1.2 polyester acid equivalents.

2. An article of manufacture as in claim 1 in which the dicarboxylic acid is sebacic acid.

3. An article of manufacture as in claim 1 in which the dicarboxylic acid is adipic acid.

4. An article of manufacture as in claim 1 in which the mixture of the acidic polyester and the complex epoxide resin is partially condensed before impregnating and coating the sheet material.

5. An article of manufacture comprising sheet material, at least a surface of which consists essentially of mica, the said sheet material being coated and impregnated with a mixture of ingredients comprising (1) an acidic polyester containing a plurality of free carboxyl groups sufficient in number to give an acid number above 250 and comprising the product of reaction of a mixture of ingredients comprising glycerine and adipic acid in which there are present from 2.2 to 3 mols of the adipic acid per mol of glycerine and (2) a complex epoxide resin comprising a polyether derivative of a polyhydric organic compound containing epoxy groups and prepared by reacting epichlorhydrin with bis-(4-hydroxyphenyl)-2,2-propane, the proportions of said polyester and epoxide resin being such that for each epoxide equivalent there are from 0.8 to 1.2 polyester acid equivalents.

6. An article of manufacture comprising sheet material at least a surface of which consists essentially of mica, said sheet material being coated and impregnated with a mixture of ingredients comprising (1) an acidic polyester containing a plurality of free carboxyl groups sufficient in number to give an acid number above 250 and comprising the product of reaction of a mixture of ingredients comprising glycerine and sebacic acid in which there are present from 2.2 to 3 mols of the sebacic acid per mol of glycerine and (2) a complex epoxide resin comprising a polyether derivative of a polyhydric organic compound containing epoxy groups and prepared by reacting epichlorohydrin with bis-(4-hydroxyphenyl)-2,2-propane, the proportions of said polyester and epoxide resin being such that for each epoxide equivalent there are from 0.8 to 1.2 polyester acid equivalents.

7. An article of manufacture as in claim 6 in which the mixture of the acidic polyester and the complex epoxide resin is partially condensed prior to impregnating and coating the mica sheet material.

8. An insulated electrical conductor comprising in combination a metallic core and a wrapping of sheet material at least a surface of which consists essentially of mica, said sheet material being impregnated and coated with a cured mixture of ingredients comprising (1) an acidic polyester containing a plurality of free carboxyl groups sufficient in number to give an acid number above 250 and comprising the product of reaction of a mixture of ingredients comprising glycerine and an aliphatic dicarboxylic acid containing from 5 to 10 carbon atoms in which there are present from 2.2 to 3 mols of dicarboxylic acid per mol of glycerine and (2) a complex epoxide resin containing epoxy groups comprising a polyether derivative of a polyhydric organic compound selected from the class consisting of polyhydric alcohols and phenols having at least two phenolic hydroxy groups, the proportions of said polyester and epoxide resin being such that for each epoxide equivalent there are from 0.8 to 1.2 polyester acid equivalents.

9. An electrical assembly comprising a plurality of superimposed strands of copper having an outer insulation comprising sheet material at least a surface of which consists essentially of mica, the said sheet material being coated and impregnated with a cured mixture of ingredients comprising (1) an acidic polyester containing a plurality of free carboxy groups sufficient in number to give an acid number above 250 and comprising the product of reaction of a mixture of ingredients comprising glycerine and an aliphatic dicarboxylic acid containing from 5 to 10 carbon atoms in which there are present from 2.2 to 3 mols of dicarboxylic acid per mol of glycerine and (2) a complex epoxide resin containing epoxy groups and comprising a polyether derivative of a polyhydric organic compound selected from the class consisting of polyhydric alcohols and phenols having at least two phenolic hydroxy groups, the proportions of said polyester and epoxide resin being such that for each epoxide equivalent there are from 0.8 to 1.2 polyester acid equivalents.

10. An electrical assembly comprising a plurality of superimposed strands of copper having an outer insulation comprising sheet material, at least a surface of which consists essentially of mica, the said sheet material being coated and impregnated with a cured mixture of ingredients comprising (1) an acidic polyester containing a plurality of free carboxyl groups sufficient in number to give an acid number above 250 and comprising the product of reaction of a mixture of ingredients comprising glycerine and adipic acid in which there are present from 2.2 to 3 mols of adipic acid per mol of glycerine, and (2) a complex epoxide resin containing epoxy groups comprising the product of reaction of epichlorohydrin with bis-(4-hydroxyphenyl)-2,2-propane, the porportions of said polyester and epoxide resin being such that for each epoxide equivalent, there are from 0.8 to 1.2 polyester acid equivalents.

11. The method for making an electrical assembly which comprises (1) wrapping a plurality of insulated strands of copper with a composite insulation material composed of cellulosic paper and sheet material, a surface of which consists essentially of mica, said insulation being impregnated and coated with a mixture of ingredients comprising (a) an acidic polyester containing a plurality of free carboxylic groups sufficient enough in number to give an acid number above 250 and comprising the product of reaction of a mixture of ingredients comprising glycerine and an aliphatic dicarboxylic acid containing from 5 to 10 carbon atoms in which there are present from 2.2 to 3 mols of the dicarboxylic acid per mol of glycerine and (b) a complex epoxide resin containing epoxy groups and comprising a polyether derivative of a polyhydric organic compound selected from the class consisting of polyhydric alcohols and phenols having at least two phenolic hydroxy groups, the proportion of said polyester and epoxide resin being such that for each epoxide equivalent there are from 0.8 to 1.2 polyester acid equivalents, and (2) molding the plurality of insulated strands under heat and pressure until the resinous insulation has been converted to a substantially infusible and insoluble state to give a compactly insulated electrical assembly.

12. The method of making an electrical assembly which comprises (1) wrapping a plurality of insulated strands of copper with a composite insulation material composed of cellulosic paper and sheet material, a surface of which consists essentially of mica, said insulation being impregnated and coated with a partially condensed mixture of ingredients comprising (a) an acidic polyester containing a plurality of free carboxylic groups sufficient enough in number to give an acid number above 250 and comprising the product of reaction of a mixture of ingredients comprising glycerine and adipic acid, in which there are present from 2.2 to 3 mols of the adipic acid per mol of glycerine and (b) a complex epoxide resin containing epoxy groups and comprising a polyether derivative of a polyhydric organic compound containing epoxy groups and prepared by reacting epichlorohydrin with bis-(4-hydroxyphenyl)-2,2-propane, the proportion of said polyester and epoxide resin being such that for each epoxide equivalent there are from 0.8 to 1.2 polyester acid equivalents, and (2) molding the wrapped, insulated strands under heat and pressure until the resinous insulation has been converted to the substantially infusible and insoluble state to give a compactly insulated electrical assembly.

13. An article of manufacture as in claim 5 in which the mixture of the acidic polyester and the complex epoxide resin is partially condensed prior to impregnating and coating the mica sheet material.

(References on following page)

References Cited in the file of this patent

UNITED STATES PATENTS

| | | |
|---|---|---|
| 1,200,041 | Speed | Oct. 3, 1916 |
| 2,269,185 | Dawson | Jan. 6, 1942 |
| 2,324,483 | Castan | July 30, 1943 |
| 2,479,357 | Hill et al. | Aug. 16, 1949 |
| 2,479,417 | Schulman et al. | Aug. 16, 1949 |
| 2,494,295 | Greenlee | Jan. 10, 1950 |
| 2,511,913 | Greenlee | June 20, 1950 |
| 2,549,880 | Bardet | Apr. 24, 1951 |
| 2,591,539 | Greenlee | Apr. 1, 1952 |
| 2,595,729 | Swiss et al. | May 6, 1952 |
| 2,626,223 | Sattler | Jan. 20, 1953 |